J. G. SCHWARTZ.
SAFETY AUTOMOBILE LOCK.
APPLICATION FILED APR. 6, 1920.
1,350,741.
Patented Aug. 24, 1920.
2 SHEETS—SHEET 1.
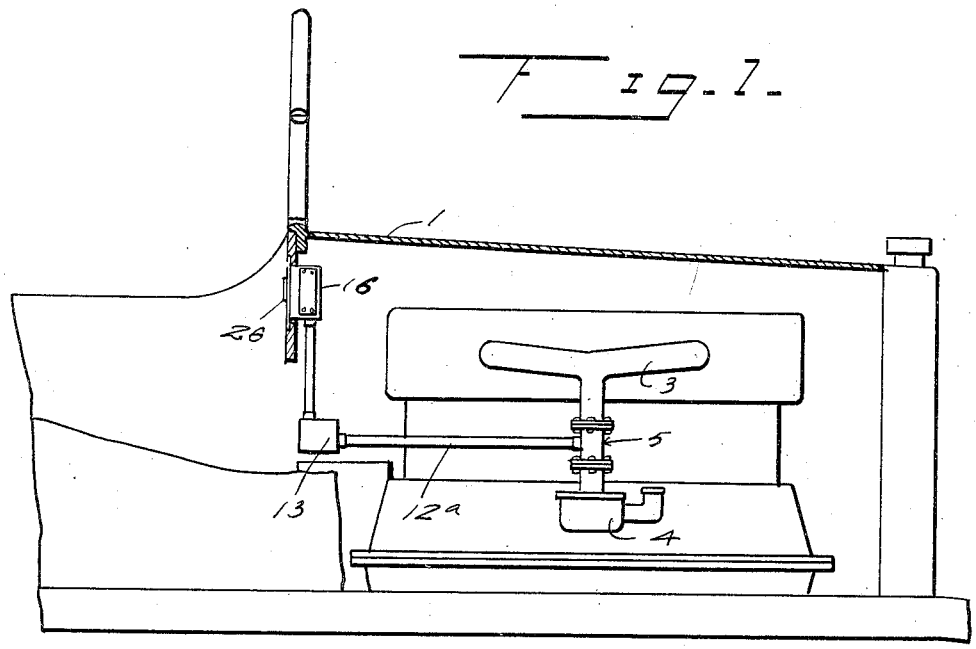
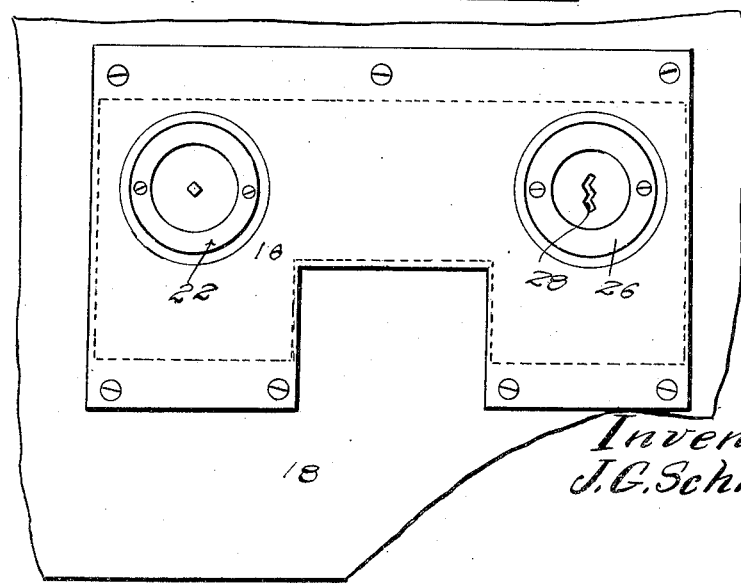
Inventor
J. G. Schwartz
By A. Randolph Jr Atty

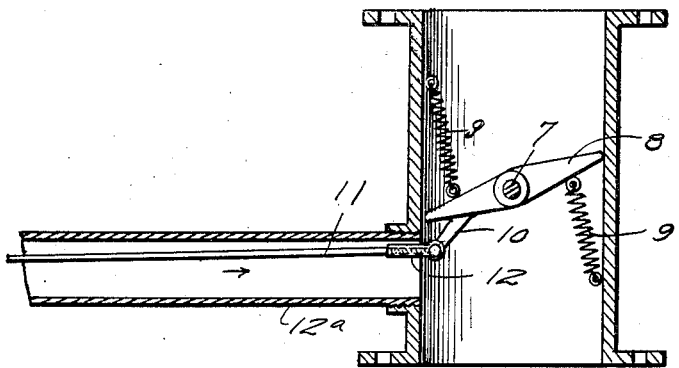
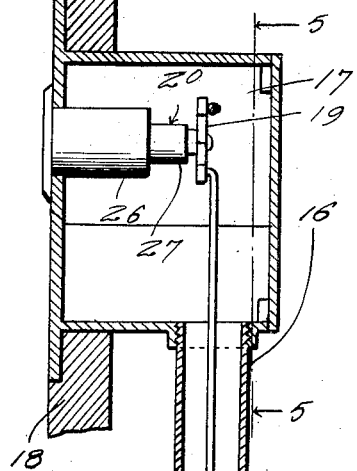
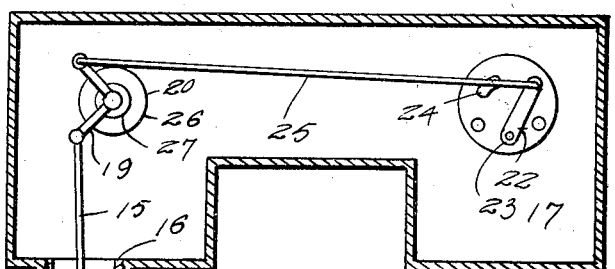
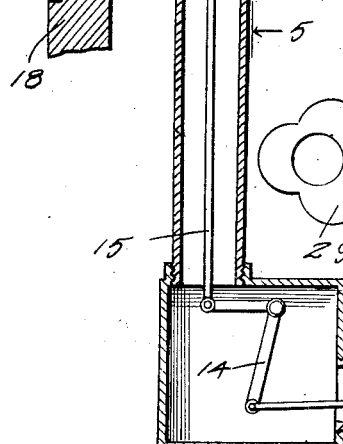
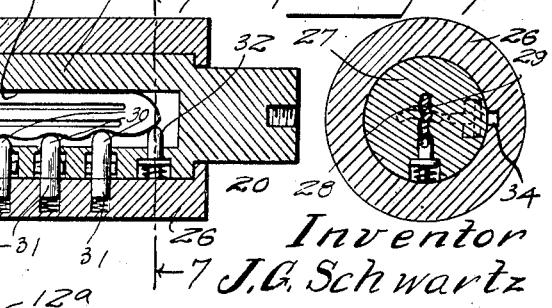

UNITED STATES PATENT OFFICE.

JOHN GEORGE SCHWARTZ, OF NEW YORK, N. Y.

SAFETY AUTOMOBILE-LOCK.

1,350,741. Specification of Letters Patent. Patented Aug. 24, 1920.

Application filed April 6, 1920. Serial No. 371,652.

*To all whom it may concern:*

Be it known that I, JOHN G. SCHWARTZ, a citizen of the United States, residing at New York city, in the county of Bronx and State of New York, have invented certain new and useful Improvements in Safety Automobile-Locks; and I do hereby declare the following to be a full, clear, and exact description of the invention, such as will enable others skilled in the art to which it appertains to make and use the same.

This invention relates to new and useful improvements in safety automobile locks, and has for one of its objects the provision of means adapted to control both the fuel and ignition to the engine of an automobile so that both may be entirely cut off when desired to lock the automobile against theft.

Another object of this invention is the provision of a self closing valve between the carbureter and intake manifold of the engine and which is held open by the insertion of a key in a lock so that when said key is removed the supply of fuel will be automatically cut off to the engine.

A further object of this invention is the provision of a connection between the lock and the switch of the ignition system so that on actuation of the lock to permit fuel to the engine, the switch is automatically closed to render the ignition system operative and which switch is opened when the key is removed for closing or cutting off the fuel to said engine.

A still further object of this invention is the provision of a safety automobile lock of the above stated character which shall be simple, durable and efficient and which may be manufactured and sold at a comparatively low cost.

With these and other objects in view as will become more apparent as the description proceeds, the invention consists in certain novel features of construction, combination and arrangement of parts as will be hereinafter fully described and claimed.

For a complete understanding of my invention reference is to be had to the following description and accompanying drawings, in which:

Figure 1 is a side elevation, illustrating a lock constructed in accordance with my invention and showing it applied to an automobile and its engine, Fig. 2 is a fragmentary view, illustrating the mounting of a portion of my invention on the instrument board, Fig. 3 is a vertical fragmentary sectional view illustrating the portion that connects to the engine, Fig. 4 is an enlarged sectional view illustrating the lock housing and the lock therein, Fig. 5 is a fragmentary longitudinal sectional view illustrating the connection between the lock and switch, Fig. 6 is a sectional view illustrating the lock, Fig. 7 is a sectional view, taken on the line 7—7 of Fig. 6.

Referring in detail to the drawings, the numeral 1 indicates an automobile having the usual internal combustion engine that is provided with an intake manifold 3 connected to a carbureter 4. An auxiliary housing 5 is interposed between the carbureter and the intake manifold and is provided with oppositely disposed ears on each end that are detachably secured to the intake manifold and the carbureter. A shaft 7 is journaled in the housing 5 and has secured thereto a butterfly valve 8 to which is secured oppositely extending coiled springs 9 that have their ends secured to the housing 5 for normally urging the butterfly valve 8 into engagement with the wall of the housing for the purpose of cutting off the fuel from the carbureter to the intake manifold. An arm 10 is connected to the valve and has detachably connected thereto one end of a rod 11 by a coupling 12 which pivotally connects said rod to the arm as well as permitting adjustment of said rod in relation to the arm. The rod 11 extends outwardly of the housing 5 and through a casing $12^a$ secured to said housing 5 and provided with an enlarged chamber 13 at its end and in which is pivotally mounted a bell crank lever 14, one arm of which is pivoted to the end of the rod 11 while its other arm is pivoted to one end of a rod 15. The rod 15 extends through a vertical casing 16 which has communication with a lock housing 17 that is firmly secured to the instrument board 18 of the automobile 1. A bell crank lever 19 has one of its arms pivoted to the upper end of the rod 15 and is secured to and operated by a lock 20 mounted in the housing 17. The housing 17 has a lateral branch on which is located the ignition switch 22 consisting of a pivoted arm 23 adapted to be moved into engagement with a contact 24 for completing an electric circuit to the engine.

A rod 25 is pivoted to the switch arm 23 and to the other arm of the bell crank lever 19, thus it will be seen that when the device is unlocked the butterfly valve 8 is moved to an open position permitting the fuel to enter the engine and simultaneously closing the switch 22 of the ignition system. As soon as the key is removed from the lock, the springs 9 automatically close the valve 8 and opens the switch 22 thus preventing the starting of the engine until the lock is actuated by the correct key. The lock 20 consists of a casing 26 that rotatably supports a key barrel 27 provided with a keyhole 28 adapted to receive the key 29 for actuating the tumblers 30 that in turn operate tumblers 31 so as to free the barrel 27 and permit rotation thereof by the turning of the key. After the barrel has been rotated the key is pushed farther into the keyhole and engages a spring pressed pin 32 causing the same to enter a recess 34 which holds the barrel against reverse rotation until the key is partially withdrawn from the keyhole whence the valve 8 is free to move into closed position by the springs 9. The bell crank lever 19 is fixed to the barrel for rotation or oscillatory movement therewith.

While I have shown and described the preferred embodiment of my invention, it will be understood that minor changes in construction, combination and arrangement of parts may be made without departing from the spirit and scope of the invention as claimed.

Having thus described my invention what I claim is:

1. An automobile lock comprising an auxiliary housing, a lock housing, an angular casing connecting said housings, a self-closing valve in said auxiliary housing, a lock in said lock housing, a series of rods and bell crank levers in said casing for connecting the valve to the lock, and means connecting the lock to the switch of an ignition system.

2. An automobile lock comprising an auxiliary housing, a lock housing receiving the switch of an ignition system, a lock in said lock housing, a casing connecting said housings, a self-closing valve in said auxiliary housing, bell crank levers and rods in said casing for connecting the valve to the lock, and a rod connecting one of the bell crank levers to the switch for causing simultaneous actuation of the switch with that of the valve.

In testimony whereof I affix my signature in presence of two witnesses.

JOHN GEORGE SCHWARTZ.

Witnesses:
    FRED BUGGELY,
    D. J. MCCARTHY.